US011911866B2

(12) United States Patent
Hajnorouzi et al.

(10) Patent No.: US 11,911,866 B2
(45) Date of Patent: Feb. 27, 2024

(54) NANOPARTICLES PRODUCTION

(71) Applicants: Abazar Hajnorouzi, Tehran (IR); Reza Afzalzadeh, Tehran (IR)

(72) Inventors: Abazar Hajnorouzi, Tehran (IR); Reza Afzalzadeh, Tehran (IR)

( * ) Notice: Subject to any disclaimer, the term of this patent is extended or adjusted under 35 U.S.C. 154(b) by 942 days.

(21) Appl. No.: 16/888,737

(22) Filed: May 31, 2020

(65) Prior Publication Data

US 2020/0290171 A1 Sep. 17, 2020

Related U.S. Application Data

(60) Provisional application No. 62/855,939, filed on Jun. 1, 2019.

(51) Int. Cl.

*B24B 1/04* (2006.01)
*B02C 19/18* (2006.01)
*B24B 47/04* (2006.01)

(52) U.S. Cl.

CPC ................ *B24B 1/04* (2013.01); *B02C 19/18* (2013.01); *B24B 47/04* (2013.01)

(58) Field of Classification Search

CPC ...................................................... B02C 19/18
See application file for complete search history.

(56) References Cited

U.S. PATENT DOCUMENTS 7,954,323 B2 * 6/2011 Bellows ................ F16B 33/008 411/378
9,034,201 B2 * 5/2015 Mayfield ................ B82Y 30/00 433/199.1
10,538,910 B2 * 1/2020 Espinosa ............... E04C 5/0645

FOREIGN PATENT DOCUMENTS

CN 110202425 A * 9/2019
EP 2808105 A1 * 12/2014 ............ B22F 1/0018

* cited by examiner

*Primary Examiner* — Katrina M Stransky
*Assistant Examiner* — Jared O Brown
(74) *Attorney, Agent, or Firm* — Bajwa IP Law Firm; Haris Zaheer Bajwa

(57) ABSTRACT

A method and a system for producing nanoparticles. The method includes obtaining a foil covered screw by wrapping a foil around an externally threaded section of an outer surface of a screw, placing the foil between an internally threaded section of an inner surface of a nut and the externally threaded section of the outer surface of the screw by screwing the foil covered screw into the nut, and grinding the foil between the internally threaded section of the inner surface of the nut and the externally threaded section of the outer surface of the screw by vibrating one of the nut and the foil covered screw along a first axis. The system includes a foil covered screw, a nut with an internally threaded section, and an ultrasound transducer. The nut and the screw are configured to grind the foil between the internally threaded section of the nut and the externally threaded section of the screw responsive to one of the nut and the screw vibrating along the first axis.

18 Claims, 17 Drawing Sheets

100

NANOPARTICLES PRODUCTION

CROSS-REFERENCE TO RELATED APPLICATION

This application claims the benefit of priority from U.S. Provisional Patent Application Ser. No. 62/855,939, filed on Jun. 1, 2019, and entitled "ULTRASOUND ABLATION METHOD FOR NANOPARTICLE GENERATION" which is incorporated herein by reference in its entirety.

TECHNICAL FIELD

The present disclosure generally relates to nanoparticles, and more particularly, to a method for producing nanoparticles.

BACKGROUND

In recent decades, nanoparticles have received considerable attention due to their numerous potential applications. For example, aluminum nanoparticles may be applied in pyro techniques due to their high enthalpy of combustion and their high reaction surface area. Aluminum nanoparticles are also very promising because, for example, they can help in speeding up the production of hydrogen and facilitate the storage of hydrogen. Furthermore, nanostructures are one of the most attractive materials for research objectives such as optoelectronic applications, energy storage, and energetic applications.

In general, several methods with two underlying approaches for producing nanoparticles are conventionally utilized. The first approach which is called the top-down approach includes mechanical methods such as standard ball milling process, arc plasma spray, laser ablation in solution, and electric explosion of wires. The second approach which is called bottom-up approach includes chemical methods such as wet-chemical synthesis, mechano-chemical process, and sono-electro-chemical process.

The aforementioned methods have various drawbacks including, but not limited to, being expensive, time consuming, and prone to contamination. There is, therefore, a need for a non-expensive, fast, and clean method for producing nanoparticles.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments of the present disclosure, a method for producing nanoparticles is disclosed. In an exemplary embodiment, the method may include obtaining a foil covered screw by wrapping a foil around an externally threaded section of an outer surface of a screw, placing the foil between an internally threaded section of an inner surface of a nut and the externally threaded section of the outer surface of the screw by screwing the foil covered screw into the nut, and grinding the foil between the internally threaded section of the inner surface of the nut and the externally threaded section of the outer surface of the screw by vibrating one of the nut and the foil covered screw along a first axis.

In an exemplary embodiment, vibrating the one of the nut and the foil covered screw along the first axis may include vibrating the one of the nut and the foil covered screw along a main longitudinal axis of the foil covered screw. In an exemplary embodiment, vibrating the one of the nut and the foil covered screw along the first axis may include vibrating the one of the nut and the foil covered screw with a frequency between 20 KHz and 40 KHz.

In an exemplary embodiment, vibrating the one of the nut and the foil covered screw with a frequency between 20 KHz and 40 KHz may include transmitting an ultrasonic vibrational wave to the one of the nut and the foil covered screw. In an exemplary embodiment, transmitting the ultrasonic vibrational wave to the one of the nut and the foil covered screw further may include attaching the one of the nut and the foil covered screw to an ultrasound head of an ultrasound transducer.

In an exemplary embodiment, attaching the one of the nut and the foil covered screw to an ultrasound head of an ultrasound transduce may include attaching the one of the nut and the foil covered screw to a distal end of an ultrasonic booster and attaching a proximal end of the ultrasonic booster to the ultrasound head of the ultrasound transducer. In an exemplary embodiment, a diameter of the proximal end of the ultrasonic booster may be larger than a diameter of the distal end of the ultrasonic booster.

In an exemplary embodiment, the disclosed method may further include applying a downward force to one of the nut and the foil covered screw along the first axis and in a first direction. In an exemplary embodiment, applying the downward force to the one of the nut and the foil covered screw along the first axis and in the first direction may include disposing a spring between an upper surface of the one of the nut and the foil covered screw and a bottom surface of the ultrasonic booster. In an exemplary embodiment, a mechanical hardness of the screw and a mechanical hardness of the nut may be both greater than a mechanical hardness of the foil.

In an exemplary embodiment, obtaining the foil covered screw by wrapping the foil around the externally threaded section of the screw may include obtaining the foil covered screw by wrapping the foil around the externally threaded section of a titanium made screw. In an exemplary embodiment, placing the foil between the internally threaded section of the nut and the externally threaded section of the screw may include placing the foil between the internally threaded section of a titanium made nut and the externally threaded section of the titanium made screw.

In another aspect of the present disclosure, a system for producing nanoparticles is disclosed. In an exemplary embodiment, the system may include a foil covered screw, a nut, and an ultrasound transducer. In an exemplary embodiment, the foil covered screw may include a screw with an externally threaded section on an outer surface of the screw. In an exemplary embodiment, the foil covered screw may further include a foil wrapped around the externally threaded section of the screw.

In an exemplary embodiment, the nut may include an internally threaded section on an inner surface of the screw. In an exemplary embodiment, the nut may be configured to receive the screw. In an exemplary embodiment, the internally threaded section of the nut may be configured to engage with the externally threaded section of the screw responsive to the nut receiving the screw.

In an exemplary embodiment, the ultrasound transducer may include a transducer head. In an exemplary embodiment, the transducer head may be configured to vibrate one of the nut and foil covered screw along a first axis. In an exemplary embodiment, the nut and the screw may be configured to grind the foil between the internally threaded section of the nut and the externally threaded section of the screw responsive to one of the nut and the screw vibrating along the first axis.

In an exemplary embodiment, the first axis may coincide with both a main longitudinal axis of the nut and a main longitudinal axis of the foil covered screw. In an exemplary embodiment, the ultrasound transducer may be configured to vibrate one of the nut and the foil covered screw with a frequency between 20 KHz and 40 KHz.

In an exemplary embodiment, the ultrasound transducer may be configured to vibrate the one of the nut and the foil covered screw by transmitting a mechanical vibrational wave to the one of the nut and the foil covered screw through the ultrasound head.

In an exemplary embodiment, the disclosed system may further include an ultrasonic booster attached to the one of the nut and the foil covered screw at a distal end of the ultrasonic booster. In an exemplary embodiment, the ultrasonic booster may be attached to the ultrasound transducer at a proximal end of the ultrasonic booster. In an exemplary embodiment, a diameter of the proximal end of the ultrasonic booster may be larger than a diameter of the distal end of the ultrasonic booster. In an exemplary embodiment, the ultrasonic booster may be configured to increase a vibration amplitude of the one of the nut and the foil covered screw.

In an exemplary embodiment, the disclosed system may further include a spring disposed between a top surface of the one of the nut and the foil covered screw and a bottom surface of the ultrasonic booster. In an exemplary embodiment, the spring may be configured to apply a downward force to one of the nut and the foil covered screw along the first axis and in a first direction.

In an exemplary embodiment, a mechanical hardness of the screw and a mechanical hardness of the nut may be both greater than a mechanical hardness of the foil. In an exemplary embodiment, the screw and the nut may be both made of titanium.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed a method for producing nanoparticles. An exemplary method may include wrapping a thin foil, which may be made of a specific material, such as aluminum or copper, around external threads of a screw and then screwing the screw into a nut. The exemplary method may further include attaching one of the nut and the screw to a head of an ultrasonic transducer and vibrating the nut vertically by utilizing the ultrasonic transducer. Vertical vibration of the one of the nut and the screw may grind the thin foil between internal threads of the nut and external threads of the screw. Grinding the thin foil between internal threads of the nut and external threads of the screw may lead to producing nanoparticles of the specific material.

Figure 1:
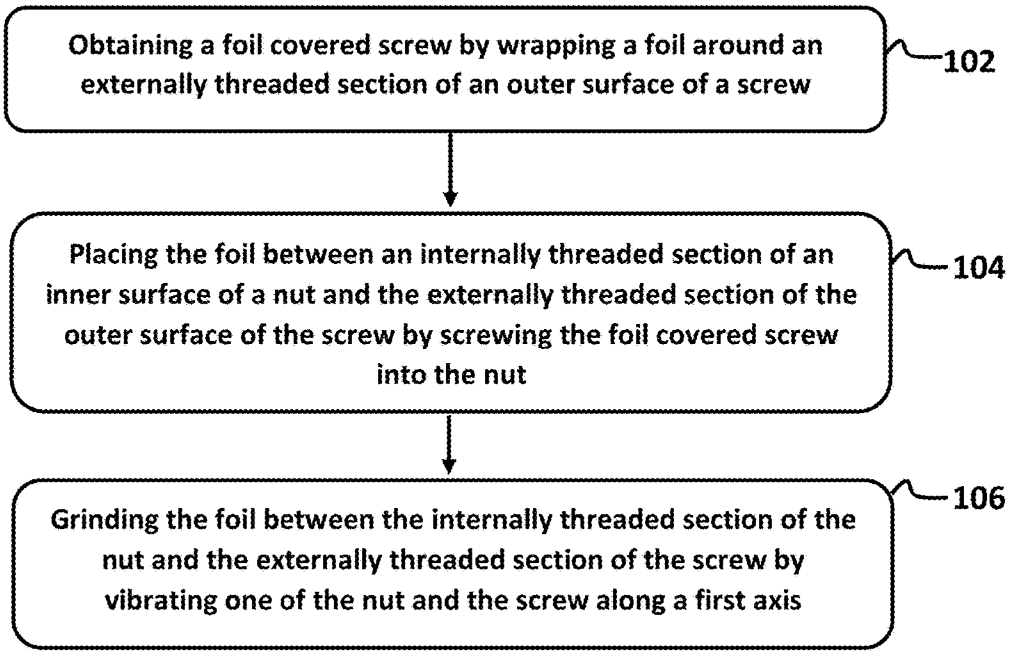
FIG. 1 illustrates a flowchart of a method for producing nanoparticles, consistent with one or more exemplary embodiments of the present disclosure.

FIG. 1 shows a flowchart of a method for producing nanoparticles, consistent with one or more exemplary embodiments of the present disclosure. An exemplary method 100 may include obtaining a foil covered screw by wrapping a foil around an externally threaded section of an outer surface of a screw (step 102), placing the foil between an internally threaded section of an inner surface of a nut and the externally threaded section of the outer surface of the screw (step 104), and grinding the foil between the internally threaded section of the inner surface of the nut and the externally threaded section of the outer surface of the screw by vibrating one of the nut and the screw along a first axis (step 106). In an exemplary embodiment, method 100 may facilitate producing nanoparticles by utilizing an ultrasound transducer.

Figure 2:
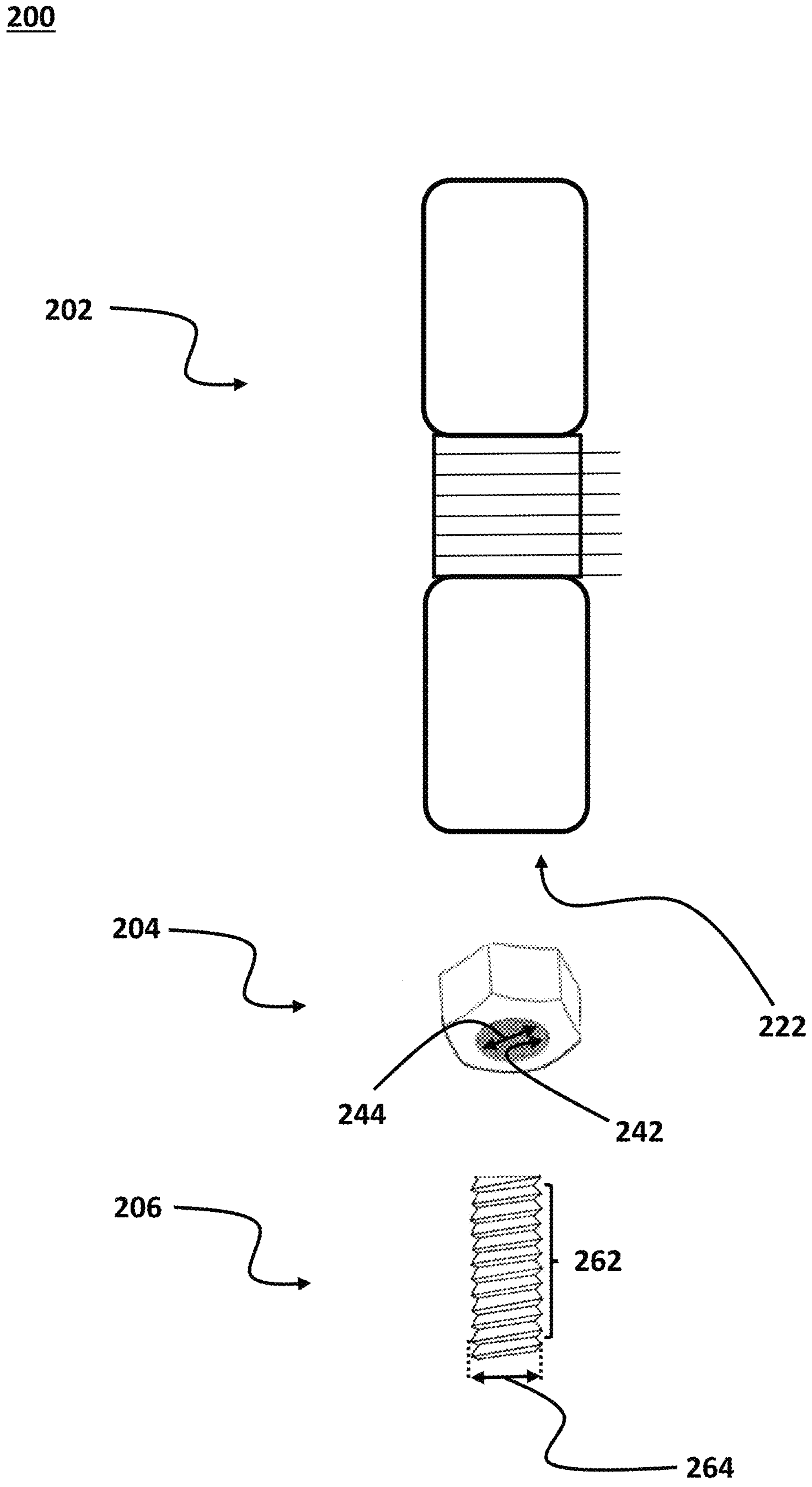
FIG. 2 illustrates an exploded view of a nanoparticle production system, consistent with one or more exemplary embodiments of the present disclosure.

FIG. 2 shows an exploded view of a nanoparticle production system 200, consistent with one or more exemplary embodiments of the present disclosure. In an exemplary embodiment, different steps of method 100 may be implemented by utilizing nanoparticle production system 200. In an exemplary embodiment, nanoparticle production system 200 may include an ultrasound transducer 202, a nut 204, and a screw 206. In an exemplary embodiment, nut 204 may include an internally threaded section 242 on an inner surface of nut 204. In an exemplary embodiment, screw 206 may include an externally threaded section 262 on an outer surface of screw 206. In an exemplary embodiment, externally threaded section 262 of screw 206 may be configured to engage with internally threaded section 242 of nut 204. In an exemplary embodiment, an inner diameter 244 of nut 204 may correspond to an outer diameter 264 of screw 206. In an exemplary embodiment, a shape of screw 206 may correspond to nut 204, and therefore, screw 206 may be configured to be screwed into nut 204.

Figure 3:
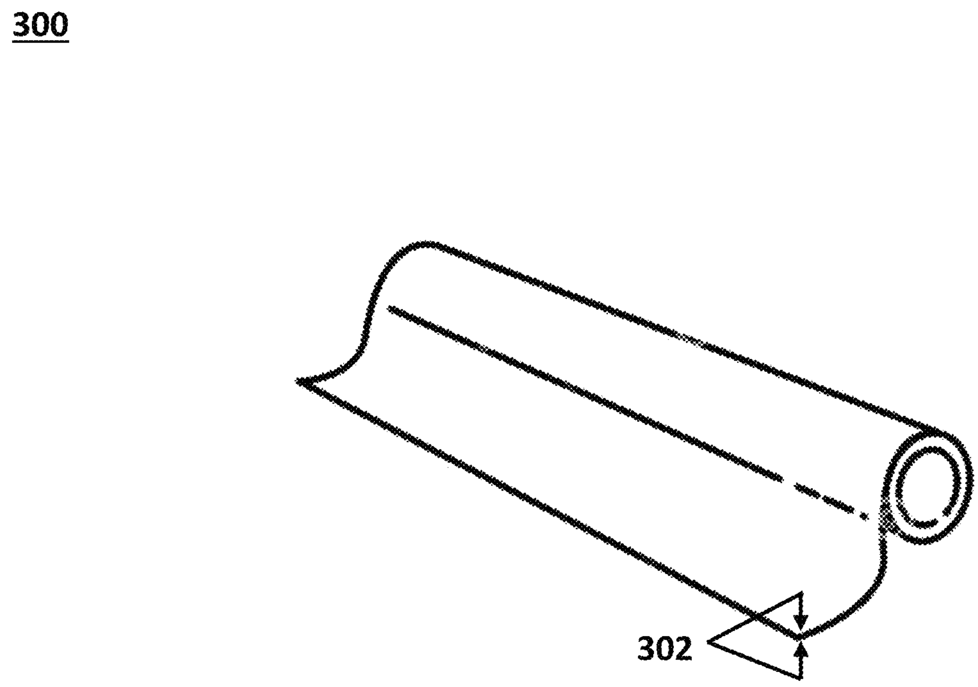
FIG. 3 illustrates a foil, consistent with one or more exemplary embodiments of the present disclosure.

FIG. 3 shows a foil 300, consistent with one or more exemplary embodiments of the present disclosure. In an exemplary embodiment, foil 300 may be made of a specific material such as aluminum, copper, or any other material. In an exemplary embodiment, it may be understood that nanoparticles produced by method 100 may be of the same material as the material of foil 300. In an exemplary embodiment, a thickness 302 of foil 300 may be in a range between 10 μm and 40 μm.

Figure 4:
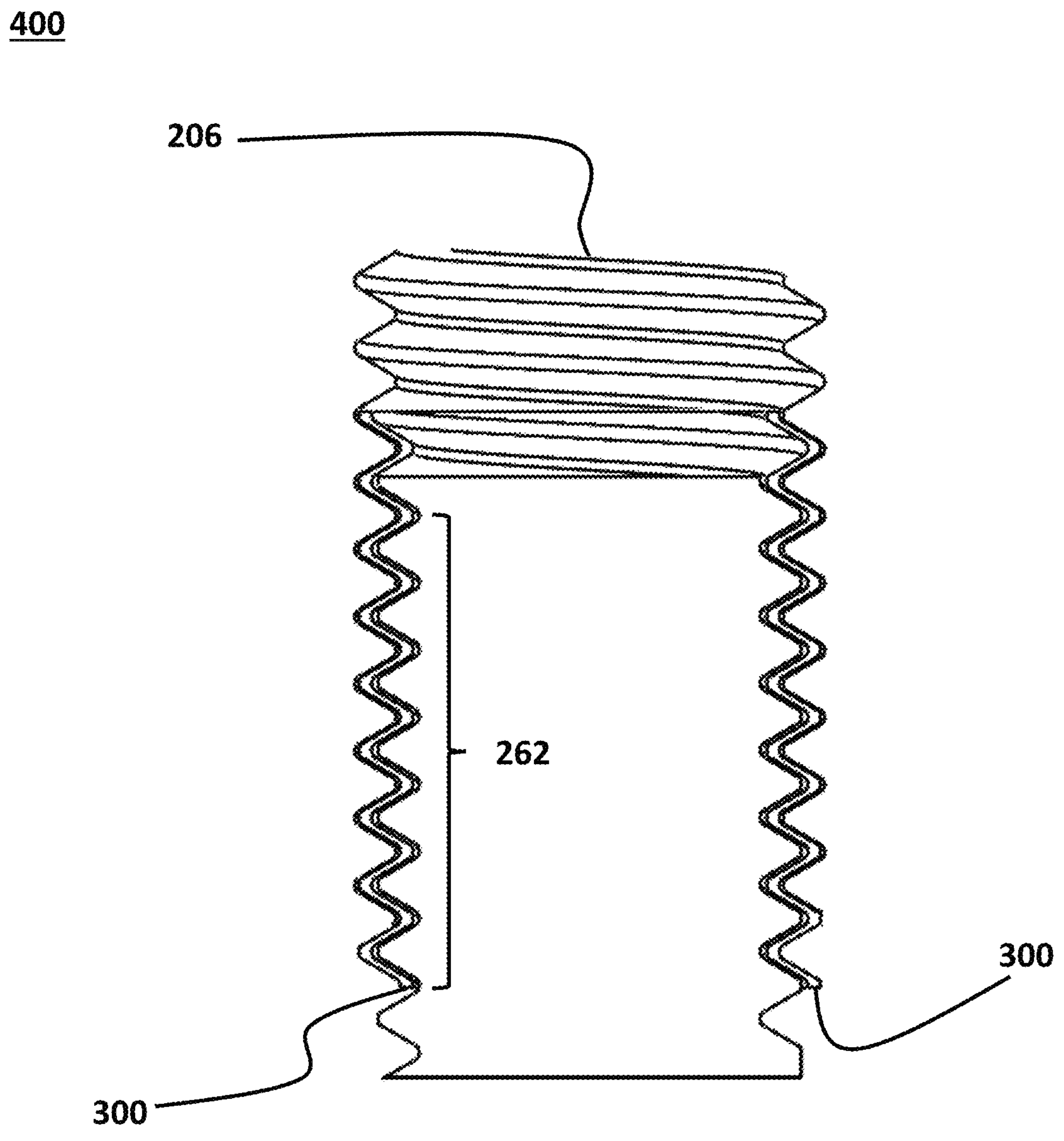
FIG. 4 illustrates a side view of a foil covered screw, consistent with one or more exemplary embodiments of the present disclosure.

FIG. 4 shows a side view of foil covered screw 400, consistent with one or more exemplary embodiments of the present disclosure. In an exemplary embodiment, foil covered screw 400 may be obtained by step 102 of method 100. As shown in FIG. 4, in an exemplary embodiment, in order to implement step 102, foil 300 may be wrapped around externally threaded section 242 of nut 204 in such a way that foil 300 take a substantial form of externally threaded section 242 of screw 206

Figure 5A:
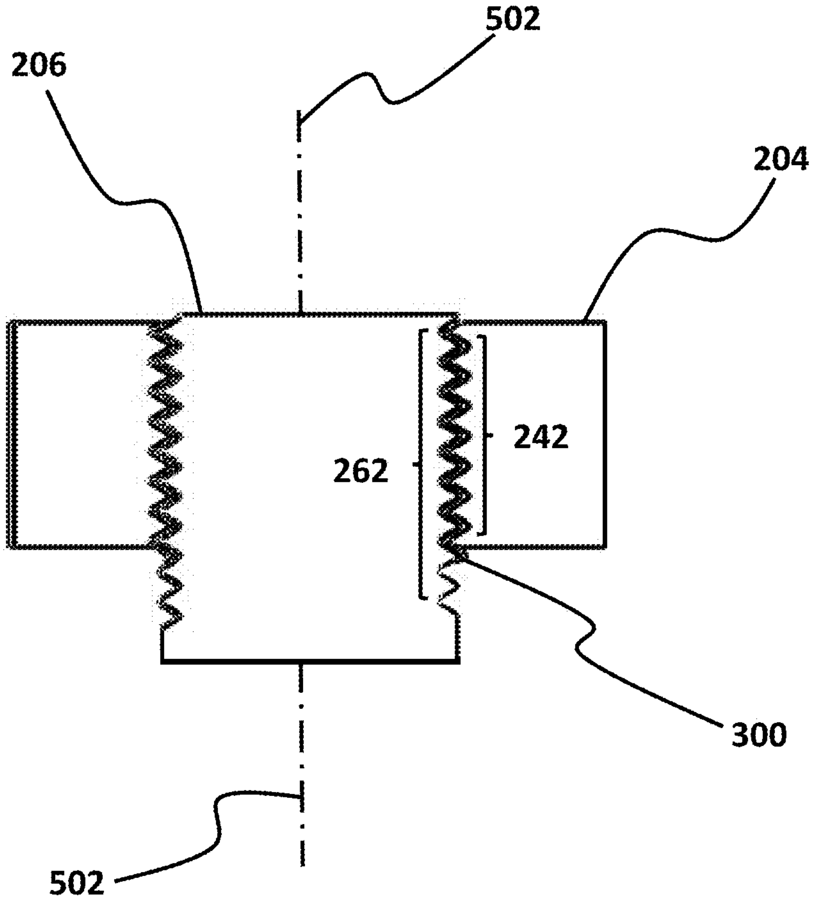
FIG. 5A illustrates a side view of a foil covered screw and a nut in a scenario in which the foil covered screw is screwed into nut, consistent with one or more exemplary embodiments of the present disclosure.
Figure 5B:
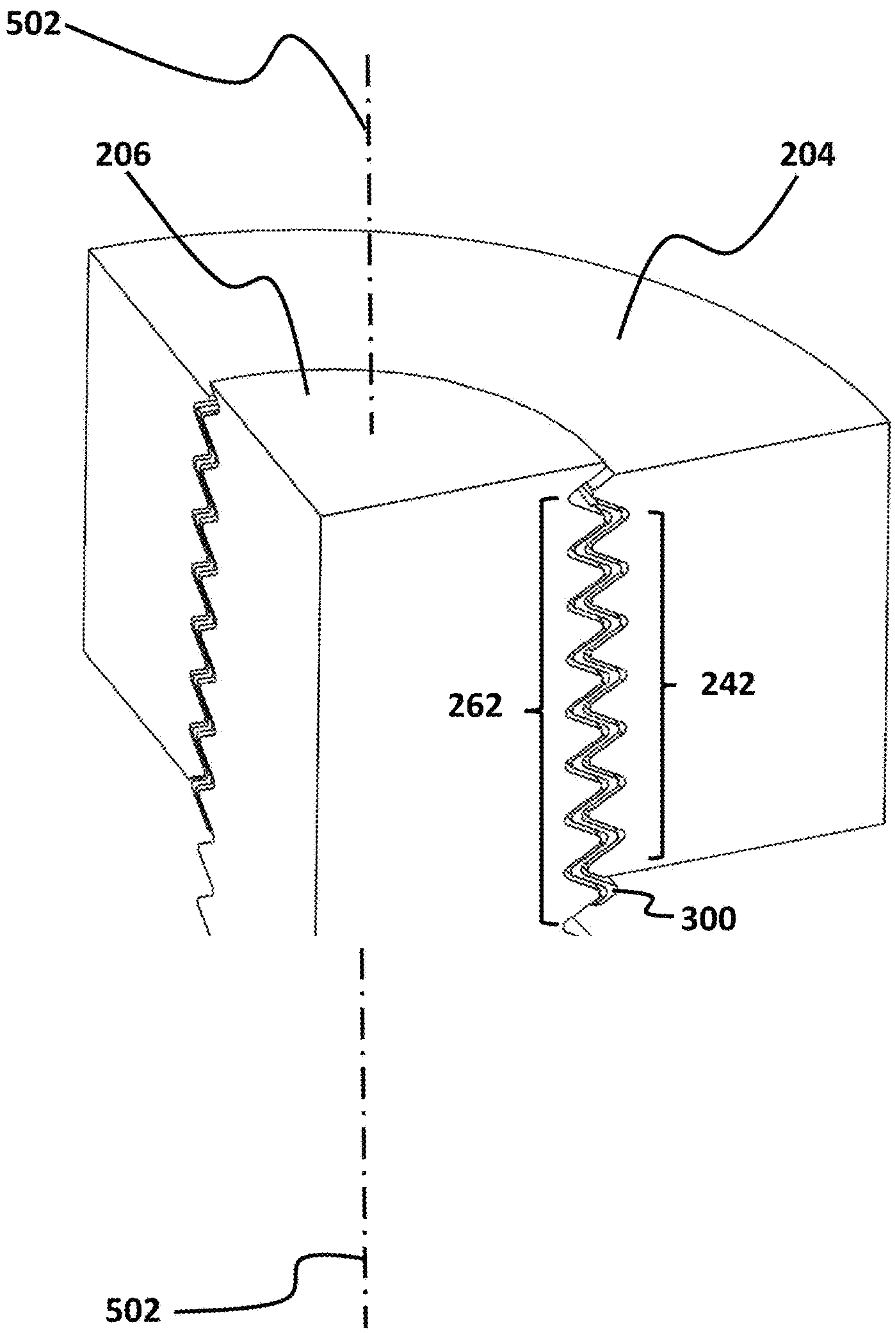
FIG. 5B illustrates a sectional view of a foil covered screw and a nut in a scenario in which the foil covered screw is screwed into the nut, consistent with one or more exemplary embodiments of the present disclosure.

In an exemplary embodiment, in order to implement step 104 of method 100, foil covered screw 400 may be screwed into nut 204. In an exemplary embodiment, when foil covered screw 400 is screwed into nut 204, foil 300 may be placed between internally threaded section 262 of screw 206 and internally threaded section 242 of nut 204. FIG. 5A shows a side view of foil covered screw 400 and nut 204 in a scenario in which foil covered screw 400 is screwed into nut 204, consistent with one or more exemplary embodiments of the present disclosure. FIG. 5B shows a sectional view of foil covered screw 400 and nut 204 in a scenario in which foil covered screw 400 is screwed into nut 204, consistent with one or more exemplary embodiments of the present disclosure.

In order to implement step 106, one of nut 204 and foil covered screw 400 may be vibrated along a first axis 502 by utilizing ultrasound transducer 202. In an exemplary embodiment, first axis 502 may coincide with both a main longitudinal axis of nut 204 and a main longitudinal axis of screw 400. In an exemplary embodiment, main longitudinal axis of nut 204 and main longitudinal axis of screw 400 may overlap with each other. In an exemplary embodiment, ultrasonic transducer 202 may comprise of an apparatus which may be able to convert an electrical high voltage signal to an ultrasonic mechanical wave. In an exemplary embodiment, ultrasonic transducer 202 may be able to produce an ultrasonic mechanical wave at a head 222 of ultrasonic transducer 222. In an exemplary embodiment, vibrating one of nut 204 and foil covered screw 400 may be implemented in two scenarios. In a first scenario, nut 204 may be vibrated by utilizing ultrasound transducer 202. In a second scenario, foil covered screw 400 may be vibrated by utilizing ultrasound transducer 202.

Figure 6A:
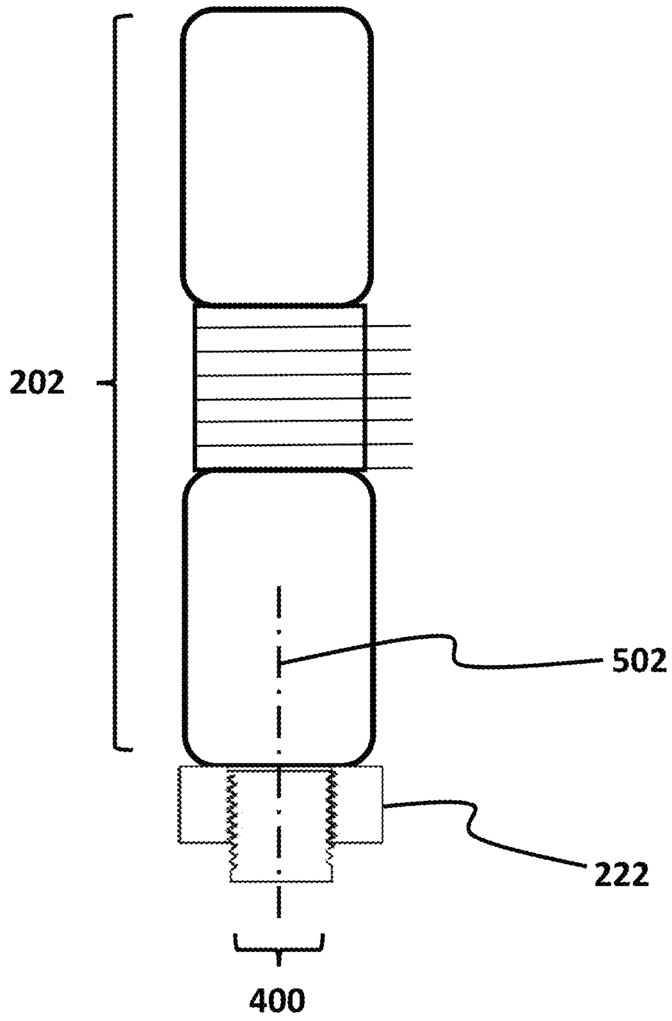
FIG. 6A illustrates a schematic of a nanoparticle production system in a first scenario, consistent with one or more exemplary embodiments of the present disclosure.

FIG. 6A shows a schematic of nanoparticle production system 200 in the first scenario, consistent with one or more exemplary embodiments of the present disclosure. As shown in FIG. 6A, in an exemplary embodiment, in order to implement step 106, nut 204 may be attached to head 222 of ultrasound transducer 202. In an exemplary embodiment, nut 204 and head 222 of ultrasonic transducer 202 may be manufactured seamlessly to constitute an integrated part of nanoparticle production system 200. In an exemplary embodiment, when nut 204 is attached to head 222 of ultrasound transducer 202, ultrasonic transducer 202 may urge nut 204 to vibrate along first axis 502. In an exemplary embodiment, ultrasonic transducer 202 may urge nut 204 to vibrate along first axis 502 with a frequency between 20 KHz and 40 KHz. Specifically, ultrasonic transducer 202 may urge screw 206 to vibrate along first axis 502 with a frequency equal to 26.5 KHz. In an exemplary embodiment, responsive to vibration of screw 206 along first axis 502, foil 300 may be grinded between internally threaded section 242 of nut 204 and externally threaded section 262 of screw 206. In an exemplary embodiment, responsive to grinding foil 300 between internally threaded section 242 of nut 204 and externally threaded section 262 of screw 206, nanoparticles of the specific material, from which foil 300 is made, may be produced.

Figure 6B:
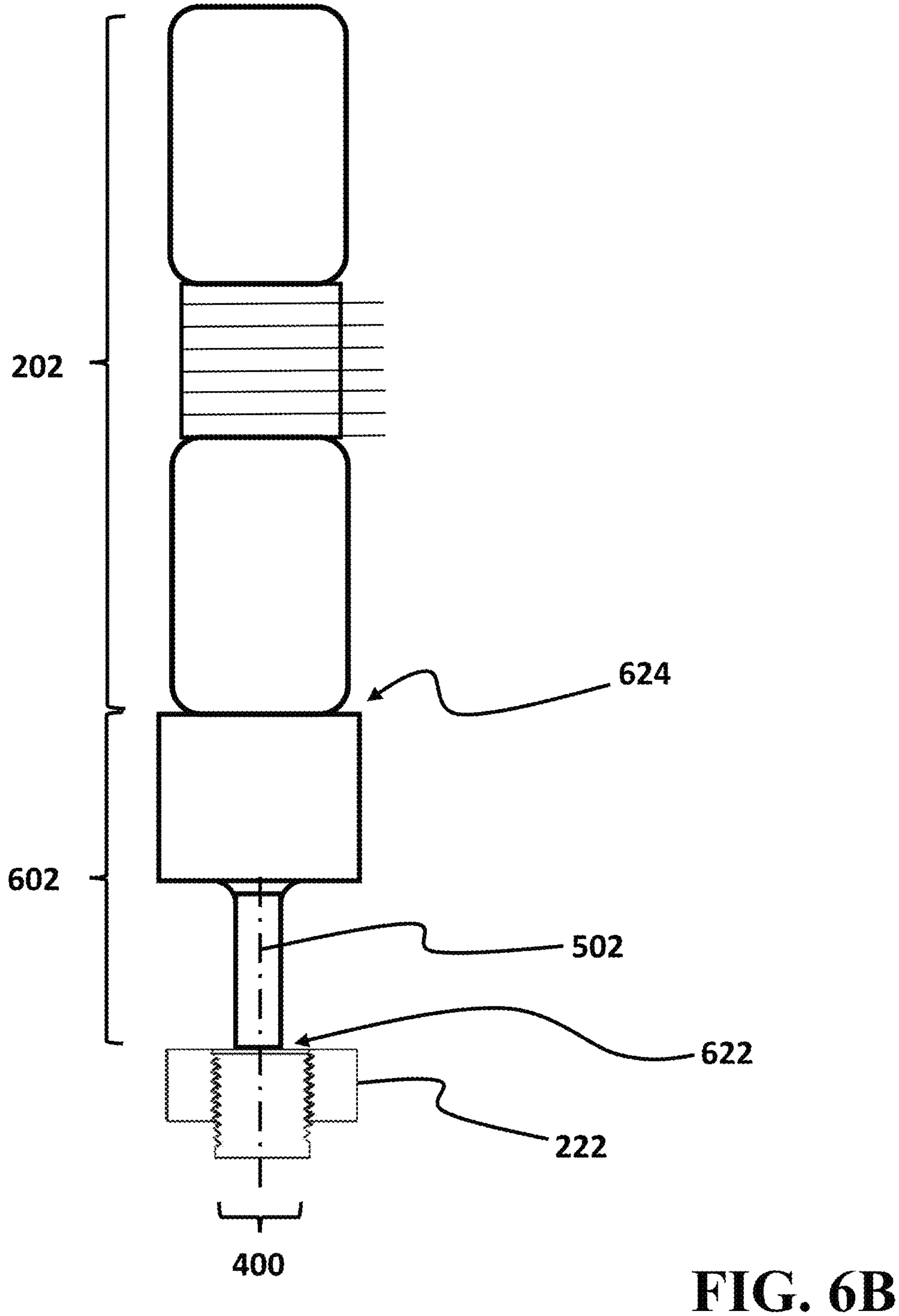
FIG. 6B illustrates a schematic of a nanoparticle production system in a first scenario, consistent with one or more exemplary embodiments of the present disclosure.
Figure 6C:
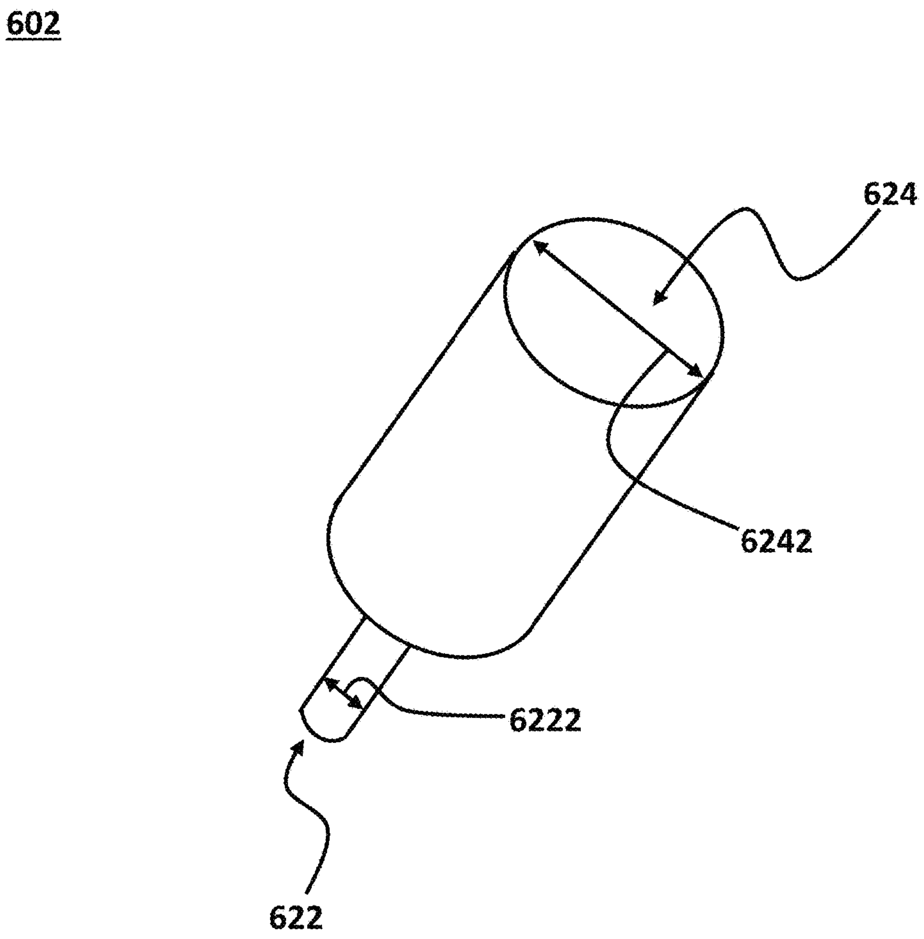
FIG. 6C illustrates a perspective view of an ultrasonic booster, consistent with one or more exemplary embodiments of the present disclosure.

FIG. 6B shows a schematic of nanoparticle production system 200 in a first scenario, consistent with one or more exemplary embodiments of the present disclosure. As shown in FIG. 6B, in an exemplary embodiment, nanoparticle production system 200 may further include an ultrasonic booster 602. FIG. 6C shows a perspective view of ultrasonic booster 602, consistent with one or more exemplary embodiments of the present disclosure. As shown in FIG. 6B, in an exemplary embodiment, nut 204 may be attached to a distal end 622 of ultrasonic booster 602. In an exemplary embodiment, nut 204 and ultrasonic booster 602 may be manufactured seamlessly to constitute an integrated part of nanoparticle production system 200. In an exemplary embodiment, a proximal end 624 of ultrasonic booster 602 may be attached to head 222 of ultrasonic transducer 222. In an exemplary embodiment, a distal diameter 6222 of distal end 622 may be smaller than a proximal diameter 6242 of proximal end 624. For example, proximal diameter 6242 of proximal end 624 may be three times larger than distal diameter 6222 of distal end 622. In an exemplary embodiment, ultrasonic booster 602 may help vibrating nut 204 with a higher amplitude. In an exemplary embodiment, vibrating nut 204 with a higher amplitude along first axis 502 may increase nanoparticles production rate. That is, higher amplitude may lead to more force being applied to the respective nanoparticles. In an exemplary embodiment, vibrating nut 204 with a higher amplitude along first axis 502 may refer to vibrating nut 204 in such a way that nut 204 moves back and forth in a longer distance along first axis 502. In an exemplary embodiment, utilizing ultrasonic booster 602 may provide significant benefits including, but not limited to, increasing nanoparticles production efficiency. In an exemplary embodiment, an increase in nanoparticles production efficiency may refer to increasing nanoparticles production rate. In other words, higher production efficiency may refer to producing more amount of nanoparticles in a specific time period. In an exemplary embodiment, ultrasonic booster 602 may be made of titanium.

Figure 7:
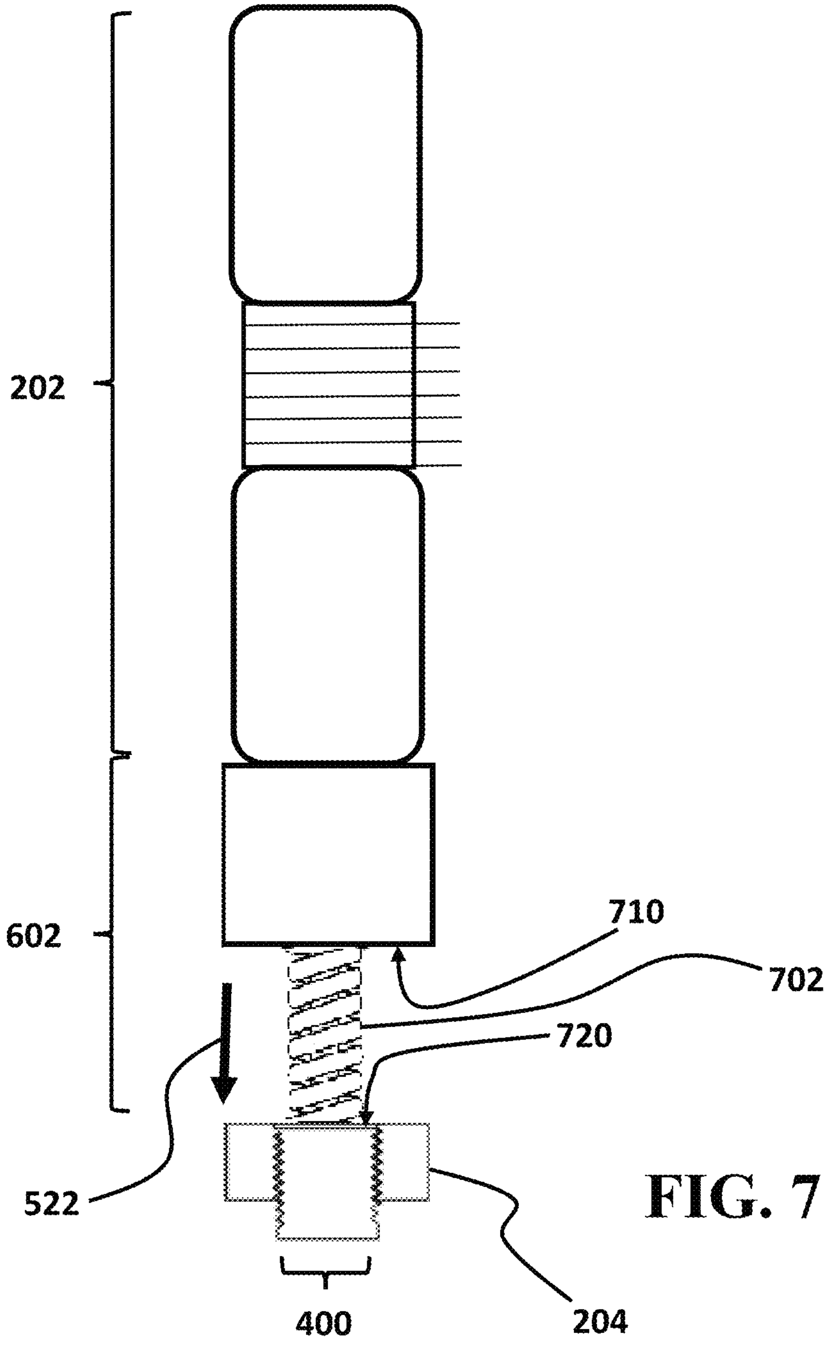
FIG. 7 illustrates a schematic of a nanoparticle production system in a first scenario, consistent with one or more exemplary embodiments of the present disclosure.

FIG. 7 shows a schematic of nanoparticle production system 200 in a first scenario, consistent with one or more exemplary embodiments of the present disclosure. As shown in FIG. 7, in an exemplary embodiment, nanoparticle production system 200 may further include a first spring 702. In an exemplary embodiment, first spring 702 may be disposed between a bottom surface 710 of ultrasonic booster 602 and a top surface 720 of screw 206. In an exemplary embodiment, first spring 702 may apply a downward force to screw 206 along first axis 502 and in a first direction 522. In an exemplary embodiment, applying a downward force to screw 206 may increase nanoparticles production rate. In an exemplary embodiment, disposing first spring 702 between bottom surface 710 of ultrasonic booster 602 and top surface 720 of screw 206 may provide significant benefits including, but not limited to, increasing nanoparticles production efficiency. In an exemplary embodiment, an increase in nanoparticles production efficiency may refer to increasing nanoparticles production rate. In other words, a higher production efficiency may refer to producing more amount of nanoparticles in a specific time period.

Figure 8A:
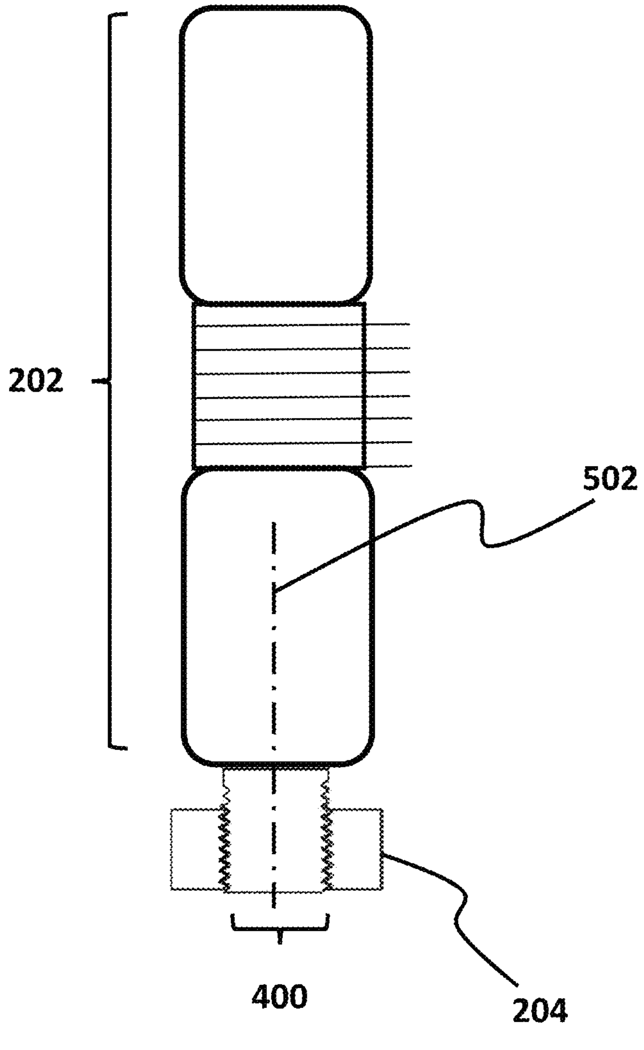
FIG. 8A illustrates a schematic of a nanoparticle production system in a second scenario, consistent with one or more exemplary embodiments of the present disclosure

FIG. 8A shows a schematic of nanoparticle production system 200 in the second scenario, consistent with one or more exemplary embodiments of the present disclosure. As shown in FIG. 8A, in an exemplary embodiment, in order to implement step 106, screw 206 may be attached to head 222 of ultrasound transducer 202. In an exemplary embodiment, screw 206 and head 222 of ultrasound transducer 202 may be manufactured seamlessly to constitute an integrated part. In an exemplary embodiment, when screw 206 is attached to head 222 of ultrasound transducer 202, ultrasonic transducer 202 may urge screw 206 to vibrate along first axis 502. In an exemplary embodiment, ultrasonic transducer 202 may urge screw 206 to vibrate along first axis 502 with a frequency between 20 KHz and 40 KHz. Specifically, ultrasonic transducer 202 may urge nut 204 to vibrate along first axis 502 with a frequency equal to 26.5 KHz. In an exemplary embodiment, responsive to vibration of nut 204 along first axis, foil 300 may be grinded between internally threaded section 242 of nut 204 and externally threaded section 262 of screw 206. In an exemplary embodiment, responsive to grinding foil 300 between internally threaded section 242 of nut 204 and externally threaded section 262 of screw 206, nanoparticles of the specific material, from which foil 300 is made, may be produced.

Figure 8B:
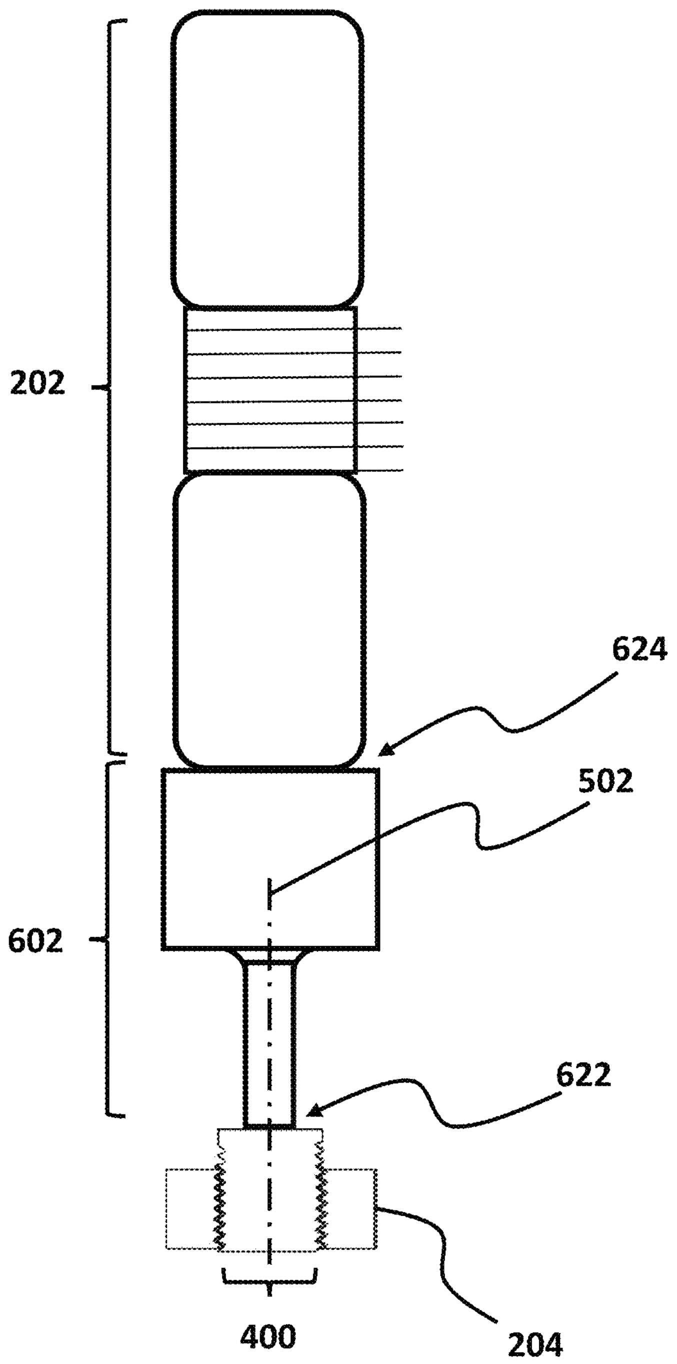
FIG. 8B illustrates a schematic of a nanoparticle production system in a second scenario, consistent with one or more exemplary embodiments of the present disclosure.

FIG. 8B shows a schematic of nanoparticle production system 200 in the second scenario, consistent with one or more exemplary embodiments of the present disclosure. As shown in FIG. 8B, in an exemplary embodiment, ultrasonic booster 602 may be disposed between screw 206 and ultrasound transducer 202. In an exemplary embodiment, screw 206 may be attached to distal end 622 of ultrasonic booster 602. In an exemplary embodiment, screw 206 and ultrasonic booster 602 may be manufactures seamlessly to constitute an integrated part. In an exemplary embodiment, proximal end 624 of ultrasonic booster 602 may be attached to head 222 of ultrasonic transducer 222. In an exemplary embodiment, ultrasonic booster 602 may help screw 206 to vibrate with a higher amplitude. In an exemplary embodiment, vibrating screw 206 with a higher amplitude may increase nanoparticles production rate. In an exemplary embodiment, utilizing ultrasonic transducer 222 may provide significant benefits including, but not limited to, increasing nanoparticles production efficiency. In an exemplary embodiment, ultrasonic booster 602 may be made of titanium.

Figure 9:
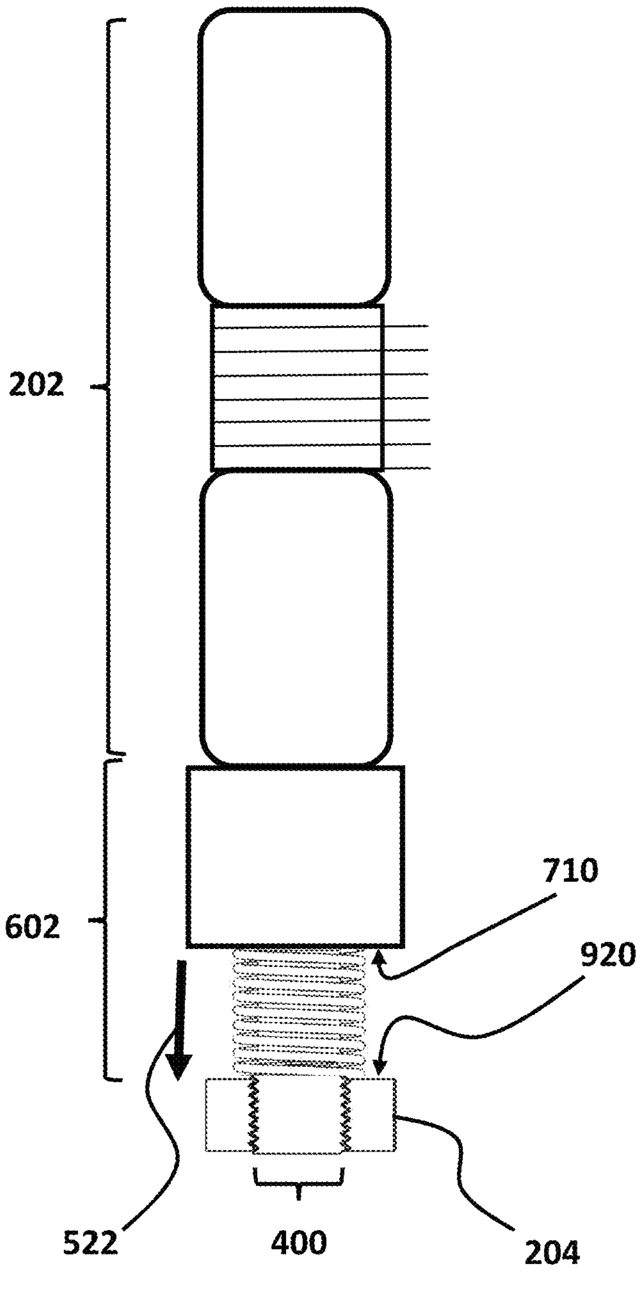
FIG. 9 illustrates a schematic of a nanoparticle production system in the second scenario, consistent with one or more exemplary embodiments of the present disclosure.

FIG. 9 shows a schematic of nanoparticle production system 200 in the second scenario, consistent with one or more exemplary embodiments of the present disclosure. As shown in FIG. 9, in an exemplary embodiment, nanoparticle production system 200 may further include a second spring 902. In an exemplary embodiment, second spring 902 may be disposed between bottom surface 710 of ultrasonic booster 602 and a top surface 920 of nut 204. In an exemplary embodiment, second spring 702 may apply a downward force to nut 204 along first axis 502 and in first direction 522.

In an exemplary embodiment, applying a downward force to nut 204 may increase nanoparticles production rate. In an exemplary embodiment, disposing second spring 702 between bottom surface 710 of ultrasonic booster 602 and top surface 920 of nut 204 may provide significant benefits including, but not limited to, increasing nanoparticles production efficiency. In an exemplary embodiment, an increase in nanoparticles production efficiency may refer to increasing nanoparticles production rate. In other words, a higher production efficiency may refer to producing more nanoparticles in a specific time period. According to embodiments disclosed herein, in an exemplary embodiment, by utilizing method 100 and nanoparticle production system 200, a fast movement sanding of a foil of a specific material may convert the foil of the specific material to nanoparticles of said specific material.

In an exemplary embodiment, it may be understood that producing nanoparticles through method 100 may rely on an erosion from a bulk of a foil disposed between internally threaded section 242 of nut 204 and externally threaded section 262 of screw 206 induced by a fast movement sanding with an aid of ultrasound transducer 202. In an exemplary embodiment, method 100 and nanoparticle production system 200 may provide significant benefits including, but not limited to, controllability on size of nanoparticles. In an exemplary embodiment, size of nanoparticles produced by method 100 may be controlled by changing a power of ultrasound transducer 202, changing dimensions of ultrasonic booster 602, changing dimensions of nut 204 and screw 206, and changing a stiffness of first spring 702 and/or second spring 902. Furthermore, by utilizing method 100 and nanoparticle production system 200, final produced nanoparticles may contain minimum amount of impurities. In an exemplary embodiment, it may be understood that high purity of final produced nanoparticles in the disclosed method herein may be due to the fact that through utilizing method 100 and nanoparticle production system 200, there may not be any additional chemical substance and/or grinding particle engaged.

Example 1

Figure 10A:
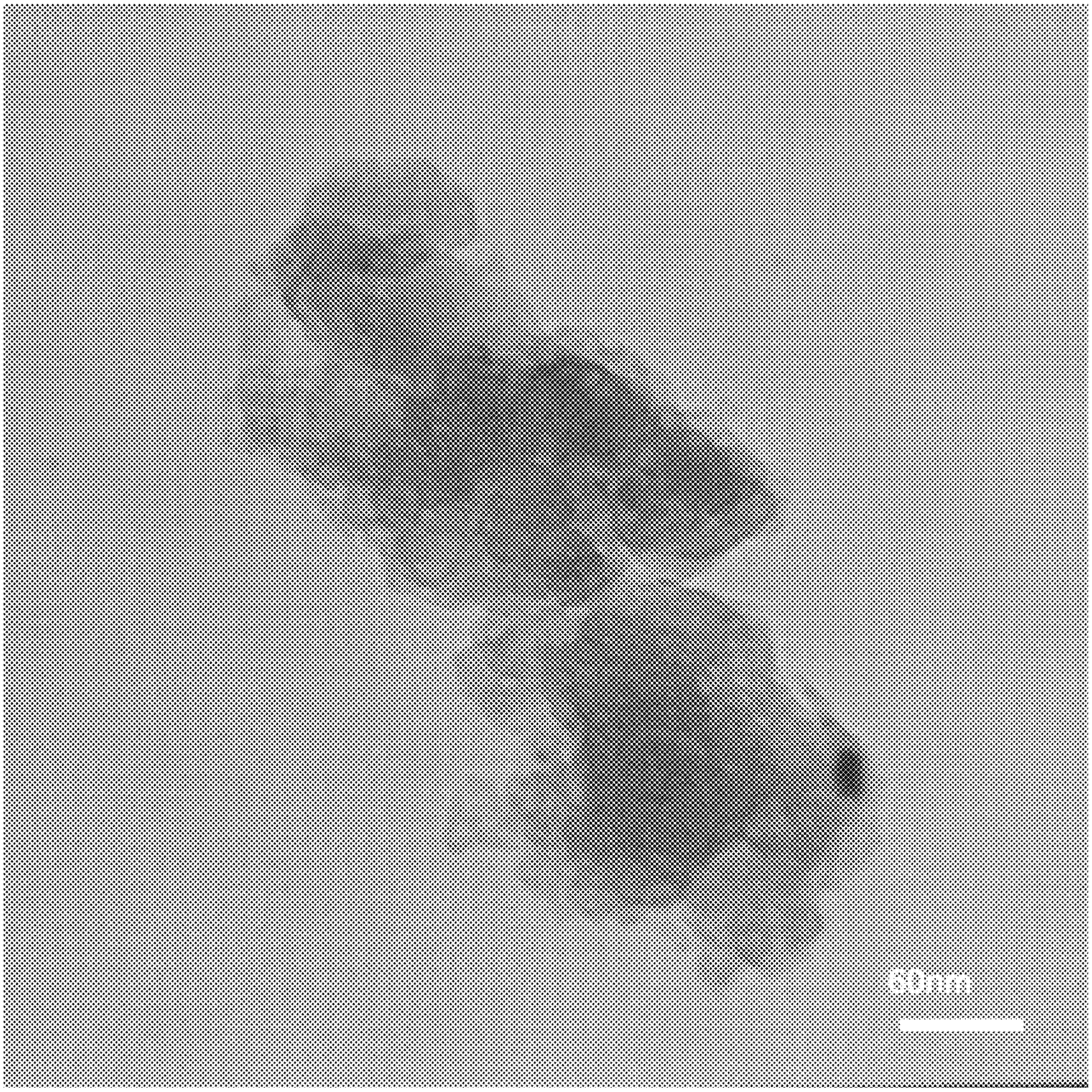
FIG. 10A illustrates a Transmission Electron Microscopy (TEM) image of produced aluminum nanoparticles, consistent with one or more exemplary embodiments of the present disclosure.
Figure 10B:
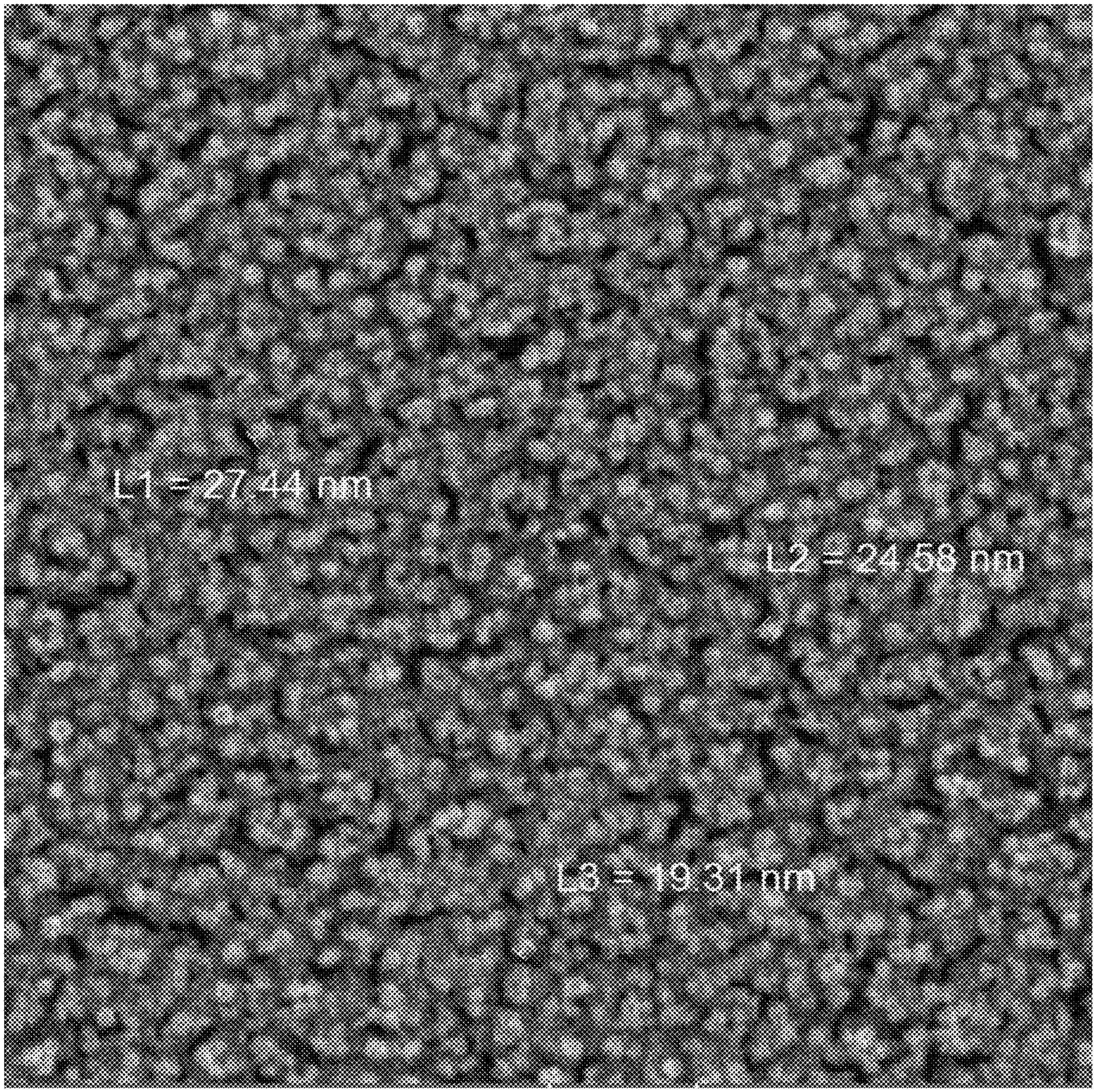
FIG. 10B illustrates a Field Emission Scanning Electron Microscopy (FESEM) image of produced aluminum nanoparticles, consistent with one or more exemplary embodiments of the present disclosure.

In this example, aluminum nanoparticles are produced utilizing exemplary method 100. In order to produce aluminum nanoparticles, an aluminum foil with a thickness of 20 μm was wrapped around an externally threaded section of an exemplary screw similar to externally threaded section 262 of screw 206 so that an exemplary foil covered screw similar to foil covered screw 400 was obtained. Then, the exemplary foil covered screw was screwed into an exemplary nut similar to nut 204. The exemplary nut attached to a head of an exemplary ultrasound transducer similar to ultrasound transducer 202. The exemplary ultrasound transducer vibrated the exemplary nut with a frequency equal to 26.5 KHz. Responsive to vibration of the exemplary nut with a frequency equal to 26.5 KHz, aluminum nanoparticles were produced. FIG. 10A shows a Transmission Electron Microscopy (TEM) image of produced aluminum nanoparticles, consistent with one or more exemplary embodiments of the present disclosure. FIG. 10B shows a Field Emission Scanning Electron Microscopy (FESEM) image of produced aluminum nanoparticles, consistent with one or more exemplary embodiments of the present disclosure. Referring to FIG. 10A and FIG. 10B, it is evident that in this example, aluminum nanoparticles were produced.

Example 2

Figure 11A:
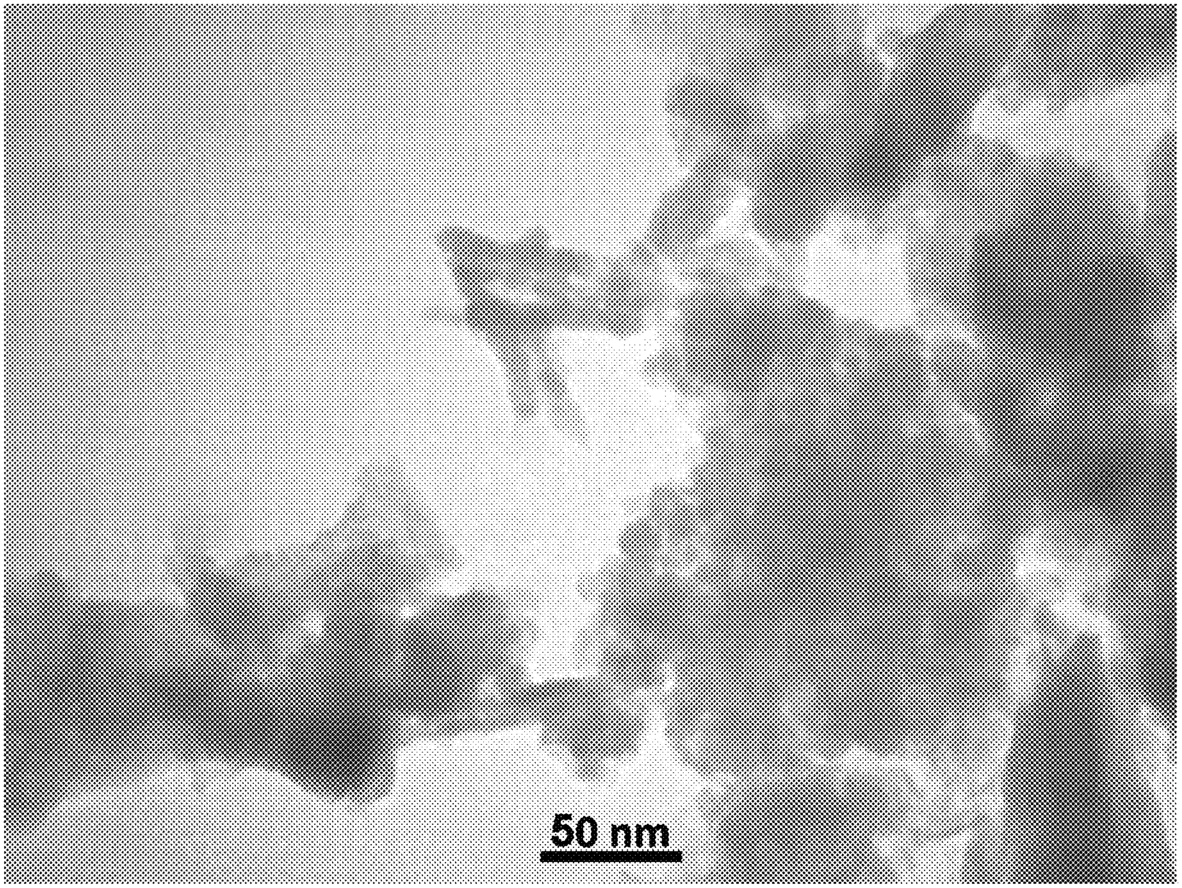
FIG. 11A illustrates a Transmission Electron Microscopy (TEM) image of produced copper nanoparticles, consistent with one or more exemplary embodiments of the present disclosure.
Figure 11B:
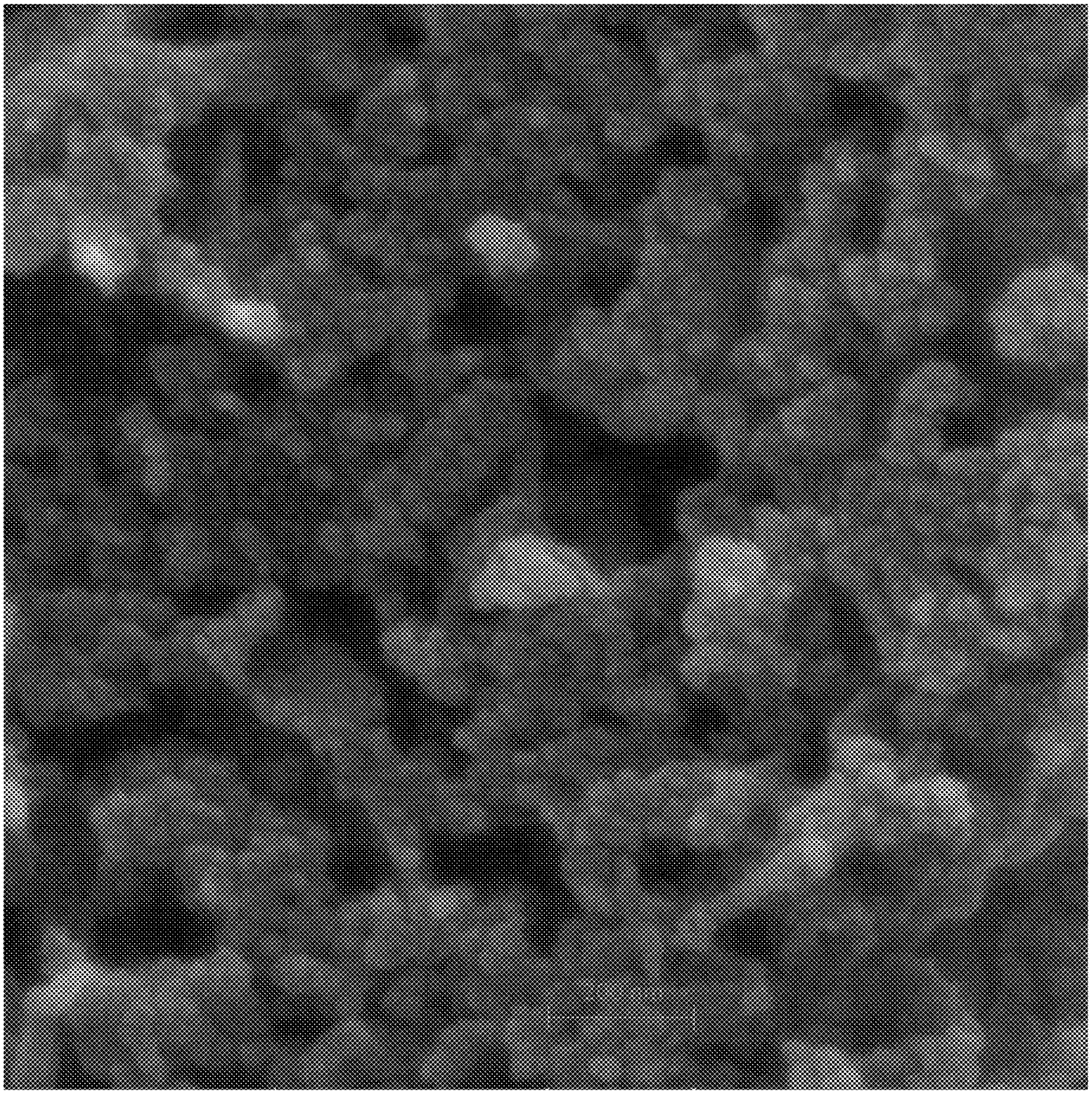
FIG. 11B illustrates a Field Emission Scanning Electron Microscopy (FESEM) image of produced copper nanoparticles, consistent with one or more exemplary embodiments of the present disclosure.

In this example, copper nanoparticles are produced utilizing exemplary method 100. In order to produce copper nanoparticles, a copper foil with a thickness of 20 μm was wrapped around an externally threaded section of an exemplary screw similar to externally threaded section 262 of screw 206 so that an exemplary foil covered screw similar to foil covered screw 400 was obtained. Then, the exemplary foil covered screw was screwed into an exemplary nut similar to nut 204. The exemplary nut attached to a head of an exemplary ultrasound transducer similar to ultrasound transducer 202. The exemplary ultrasound transducer vibrated the exemplary nut with a frequency equal to 26.5 KHz. Responsive to vibration of the exemplary nut with a frequency equal to 26.5 KHz, copper nanoparticles were produced. FIG. 11A shows a Transmission Electron Microscopy (TEM) image of produced copper nanoparticles, consistent with one or more exemplary embodiments of the present disclosure. FIG. 11B shows a Field Emission Scanning Electron Microscopy (FESEM) image of produced copper nanoparticles, consistent with one or more exemplary embodiments of the present disclosure. Referring to FIG. 11A and FIG. 11B, it is evident that in this example, copper nanoparticles were produced.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for producing nanoparticles, the method comprising:

obtaining a foil covered screw by wrapping a foil around an externally threaded section of an outer surface of a screw;

placing the foil between an internally threaded section of an inner surface of a nut and the externally threaded section of the outer surface of the screw by screwing the foil covered screw into the nut; and grinding the foil between the internally threaded section of the inner surface of the nut and the externally threaded section of the outer surface of the screw by vibrating one of the nut and the foil covered screw along a first axis.

2. The method of claim 1, wherein the vibrating of the one of the nut and the foil covered screw along the first axis comprises vibrating the one of the nut and the foil covered screw along a main longitudinal axis of the foil covered screw.

3. The method of claim 2, wherein the vibrating of the one of the nut and the foil covered screw along the first axis comprises vibrating the one of the nut and the foil covered screw with a frequency between 20 KHz and 40 KHz.

4. The method of claim 3, wherein the vibrating of the one of the nut and the foil covered screw with the frequency between 20 KHz and 40 KHz comprises transmitting an ultrasonic vibrational wave to the one of the nut and the foil covered screw.

5. The method of claim 4, wherein the transmitting of the ultrasonic vibrational wave to the one of the nut and the foil covered screw further comprises attaching the one of the nut and the foil covered screw to an ultrasound head of an ultrasound transducer.

6. The method of claim 5, wherein the attaching of the one of the nut and the foil covered screw to an ultrasound head of an ultrasound transducer comprises:

attaching the one of the nut and the foil covered screw to a distal end of an ultrasonic booster; and attaching a proximal end of the ultrasonic booster to the ultrasound head of the ultrasound transducer, a diameter of the proximal end of the ultrasonic booster is larger than a diameter of the distal end of the ultrasonic booster.

7. The method of claim 6, further comprising applying a downward force to one of the nut and the foil covered screw along the first axis and in a first direction.

8. The method of claim 7, wherein the applying of the downward force to the one of the nut and the foil covered screw along the first axis and in the first direction comprises disposing a spring between an upper surface of the one of the nut and the foil covered screw and a bottom surface of the ultrasonic booster.

9. The method of claim 8, wherein a mechanical hardness of the screw and a mechanical hardness of the nut are both greater than a mechanical hardness of the foil.

10. The method of claim 9, wherein:

the obtaining of the foil covered screw by wrapping the foil around the externally threaded section of the screw comprises obtaining the foil covered screw by wrapping the foil around the externally threaded section of a titanium made screw; and placing the foil between the internally threaded section of the nut and the externally threaded section of the screw comprises placing the foil between the internally threaded section of a titanium made nut and the externally threaded section of the titanium made screw.

11. A system for producing nanoparticles, the system comprising:

a foil covered screw comprising:

a screw with an externally threaded section on an outer surface of the screw; and a foil wrapped around the externally threaded section of the screw;

a nut with an internally threaded section on an inner surface of the nut, the nut configured to receive the screw, the internally threaded section of the nut configured to engage with the externally threaded section of the screw responsive to the nut receiving the screw; and an ultrasound transducer with an ultrasound head, the ultrasound transducer configured to vibrate one of the nut and the foil covered screw along a first axis;

wherein the nut and the screw are configured to grind the foil between the internally threaded section of the nut and the externally threaded section of the screw responsive to the one of the nut and the screw vibrating along the first axis.

12. The system of claim 11, wherein the first axis coincides with both a main longitudinal axis of the nut and a main longitudinal axis of the foil covered screw.

13. The system of claim 12, wherein the ultrasound transducer is configured to vibrate the one of the nut and the foil covered screw with a frequency between 20 KHz and 40 KHz.

14. The system of claim 13, wherein the ultrasound transducer is configured to vibrate the one of the nut and the foil covered screw by transmitting a mechanical vibrational wave to the one of the nut and the foil covered screw through the ultrasound head.

15. The system of claim 14, further comprising an ultrasonic booster attached to the one of the nut and the foil covered screw at a distal end of the ultrasonic booster, the ultrasonic booster attached to the ultrasound transducer at a proximal end of the ultrasonic booster, a diameter of the proximal end of the ultrasonic booster is larger than a diameter of the distal end of the ultrasonic booster, the ultrasonic booster is configured to increase a vibration amplitude of the one of the nut and the foil covered screw.

16. The system of claim 15, further comprising a spring disposed between a top surface of the one of the nut and the foil covered screw and a bottom surface of the ultrasonic booster, the spring configured to apply a downward force to the one of the nut and the foil covered screw along the first axis and in a first direction.

17. The system of claim 16, wherein a mechanical hardness of the screw and a mechanical hardness of the nut are both greater than a mechanical hardness of the foil.

18. The system of claim 17, wherein the screw and the nut are both made of titanium.

* * * * *